UNITED STATES PATENT OFFICE.

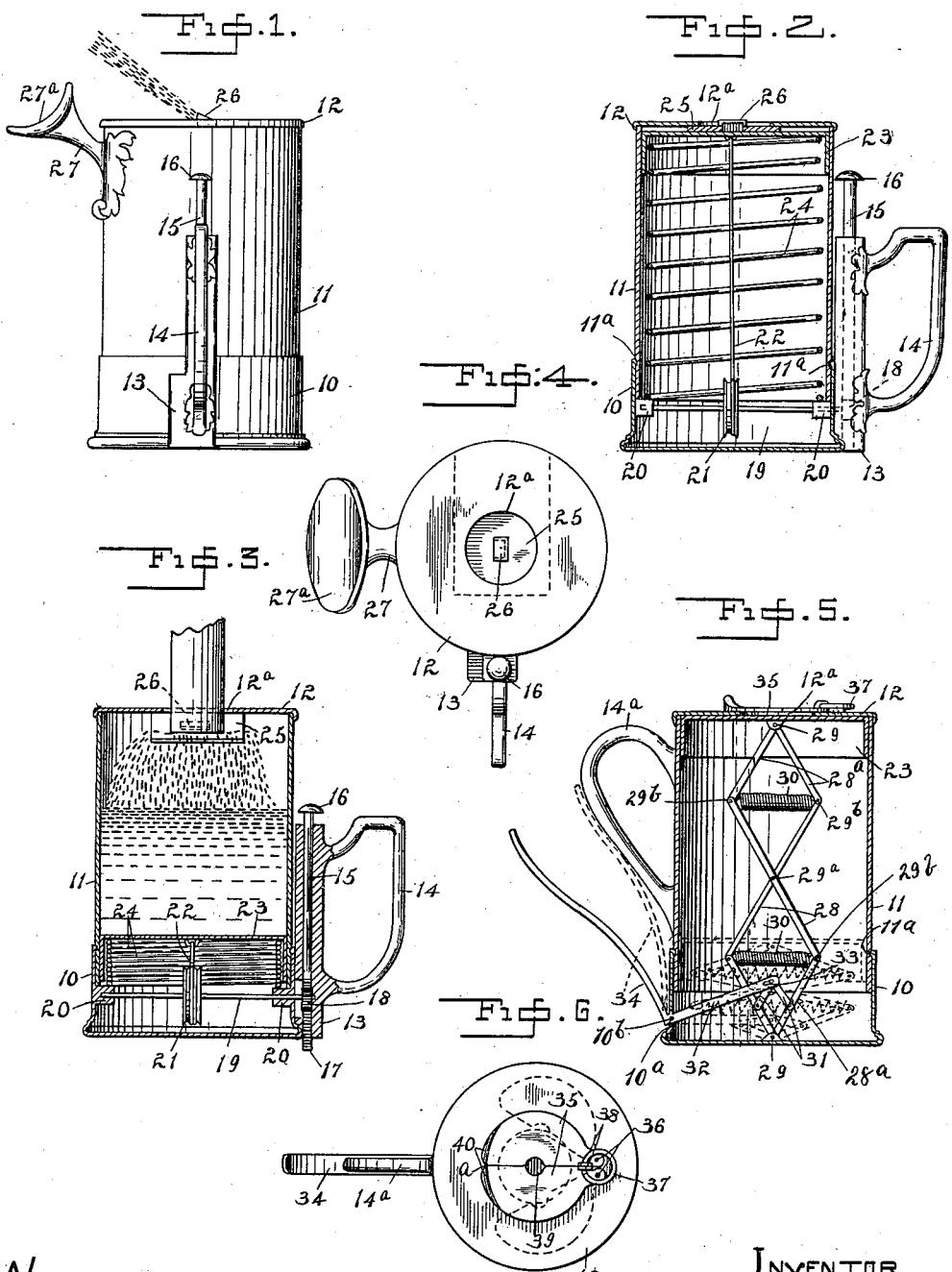

AUGUST H. HARTMAN, OF SEATTLE, WASHINGTON.

DRINKING-CUP.

1,022,548.　　　　　Specification of Letters Patent.　　Patented Apr. 9, 1912.

Application filed September 22, 1910. Serial No. 583,162.

*To all whom it may concern:*

Be it known that I, AUGUST H. HARTMAN, a citizen of the United States, residing at Seattle, in the county of King and State of Washington, have invented certain new and useful Improvements in Drinking-Cups, of which the following is a specification.

My invention relates to drinking utensils and refers especially to portable sanitary devices designed for individual use.

The chief objects of the improvements which constitute the subject matter of this application for patent are:—to provide a receptacle for water or other liquids from which a person may drink without touching the cup with his lips, this feature permitting any number of individuals to use the apparatus in succession without incurring any danger of contamination from previous users, thus adapting the device for common use in public places; to provide an appliance that will be readily portable, and to furnish means for readily refilling the receptacle.

Another object of this invention is to provide a drinking utensil that may be readily kept in a sanitary condition, the device being made in separable parts to facilitate cleaning.

I produce the desired results by employing a receptacle having a closely fitting cover and containing a piston or plunger by the aid of which the water, or other liquid may be ejected in the form of a jet or stream directly into the mouth of the user, held in proximity to the orifice from which the stream issues, means being furnished for controlling the force and direction of the stream, provision also being made for refilling the cup, which is supplied with a convenient handle.

The important details of the preferred form of my invention and certain modifications are disclosed in the accompanying drawing, which forms a part of this application, the views being as follows:—

Figure 1 is a side elevation of the complete device; Fig. 2 is a vertical section; Fig. 3 is a sectional view similar to Fig. 2, showing manner of filling the cup; Fig. 4 is a top plan view; Fig. 5 is a longitudinal section disclosing a modified form of piston operating mechanism, and Fig. 6 is a top plan view of the form shown in Fig. 5.

Referring to the details of the drawing, the numeral 10 indicates a shallow cup into which is telescopically fitted a cylinder or sleeve 11. The margin of the cup 10 is provided with a bead 11ª which engages a suitable peripheral groove upon the outside of the said sleeve, the members thus connected having a certain amount of resiliency which will permit them to be separated by the application of moderate force, for the purpose of cleaning, or assembling the internal mechanism, and when replaced the said bead will snap into its groove and hold the members firmly together. The sleeve 11 is provided with a cover in the center of which is a filling aperture 12ª, through which the water may be introduced into the interior of the receptacle. Attached to the cup 10 upon one side is a vertical post 13 having an integral handle 14. The said post is pierced vertically by a bore in which is slidably mounted a push rod 15, having a button 16 at the upper end, and provided at the lower part with gear teeth 17 forming a rack which is in engagement with a pinion 18 mounted on the projecting outer end of a shaft 19 extending transversely through the cup 10, the inner walls of the said cup being provided with lugs 20, in which the said shaft is journaled. The lower portion of the post 13 is recessed on the side next to the cup to receive the pinion 18, and when the parts are assembled the wheel is entirely concealed from view. Upon the middle of the shaft is mounted a grooved wheel or drum 21, having attached to its periphery a cord or cable 22, the upper end of which is secured to the center of a plunger or piston 23, in the form of an inverted cup which fits closely within the sleeve 11. Arranged within the cavity of the receptacle below the piston 23 is a coiled spring 24, the lower end of which rests upon the lugs 20, while the upper end enters the cavity of the plunger or piston 23, and impinges against the under side thereof, thus tending to force the piston toward the top of the sleeve 11. Controlling the opening 12ª is a valve consisting of a flat spring plate 25, which is in contact with the under side of the cover 12, and extends from one side of the receptacle nearly across to the other, and is of sufficient length and width to cover the said filling aperture. The center of the spring plate 25 opposite said aperture is furnished with an opening covered over by a deflector or hood 26, the upper side of which is inclined upwardly, as shown in Fig. 1. Attached by a stem 27 to the outside of the cup or receptacle is a chin rest, consisting of a concave plate 27ª which is intended to be engaged by the user's chin when taking a drink from the cup in the manner hereinafter explained.

Figs. 5 and 6 illustrate modifications in the plunger actuating mechanism and also changes in the cover and attachments thereto. The cup 10, sleeve 11, cover 12, and plunger 23 are constructed and arranged as in the preferred form above described, the spring 24, however, being omitted, and in place thereof are substituted toggle jointed levers 28, 28ª, pivoted at the points 29 to the bottom of the cup and the under side of the plunger. The central members 28 of the toggle are longer than the end members and cross in the middle where they are connected by a pivot to form a joint 29ª, the ends of the said levers 28 being connected by pivots to the shorter levers 28ª, forming joints 29ᵇ, and connecting the latter joints are transversely arranged coiled tension springs 30, which tend to bring the joints 29ᵇ together, thus extending the toggle levers, and as the lower attachment is fixed, the result of such action will be to urge the plunger toward the upper end of the sleeve or cup. In order to bring the plunger down to its initial position, shown in dotted outlines in Fig. 5, I provide a pair of links 31, arranged in the form of an inverted V their lower ends being pivoted to the lower levers 28ª, and having the pivot 33 connecting their upper ends working in a slot in the arm 32 of an L-shaped operating lever extending through an opening 10ª in the side of the cup 10, and pivoted at 10ᵇ, the outer end 34 of said operating lever being bent upwardly and slightly curved to fit the hand, the said arm being arranged adjacent the handle 14ª, so that the lever 34 may be engaged and operated by the same hand that grasps the cup handle. The orifice 12ª of the cover is guarded by two duplicate hinged plates or valves 35, pivoted to the cover at 36 so that they lie normally flat upon the said cover 12 above the aperture 12ª. These plates or valves are normally kept closed by a spring ring 37, the ends of which abut against a pair of lugs or ears 38, rising vertically from the plates. The opposing margins of the plates or valves 35 are furnished with semicircular notches 39, which meet to form an orifice when the shutters are closed, the location of said orifice being concentric with the opening 12ª in the cover 12. The edges of the said shutters opposite the hinges are bent slightly upward forming lips 40, and the inner corners at this point are rounded so that there is an angle *a* where the lips meet, for a purpose that will be explained.

This utensil is intended to serve as a drinking cup only and not to store or retain its contents for any length of time. For this reason the receptacle must be replenished each time it is used, as in the case of ordinary drinking cups. When it is desired to fill the cup shown in Fig. 1, the operator grasps the handle 14 and with the thumb of the same hand presses upon the button 16, thus pulling the plunger down to the position shown in Fig. 3. The cup is then held under the nozzle 41 of an ordinary faucet connected with a water supply, and pressed against the said nozzle with sufficient force to depress the spring plate 25, and when the water is turned on in the usual way it will flow into the cavity of the cup in the manner shown in Fig. 3. When the cup is removed, the plate 25 will spring back into place. Keeping the plunger still depressed the user raises the cup until the rest 27ª is in contact with his chin, when, by releasing the button 16, the action of the spring 24 will cause the plunger to ascend, forcing the water in a stream through the orifice in the spring plate 25, the hood 26 deflecting the jet into the mouth of the user held open to receive it. It will be evident that the force of the jet of water can be regulated to a nicety by the pressure of the thumb which controls the spring action.

In filling the cup shown in Figs. 5 and 6, the plunger is depressed by the action of the hand in grasping the handle 14ª, which forces the arm 34 to the position shown in dotted outlines, and retracts the toggle levers constituting the lazy tongs. The lips 40 are then pressed against the lower margin of the nozzle of the faucet by moving the cup laterally so that the nozzle will force the shutters apart and pass to a position where it will register with the opening 12ª, when the water can be turned on and the cup filled as before. As there is no deflecting member over the outlet in this form of device, the stream will be ejected vertically from the orifice 39, when the lever 34 is released and will be directed into the mouth of the drinker held open above the aperture.

Having thus described my invention what I claim as new, is:—

1. A sanitary drinking utensil, comprising a receptacle, a cover therefor having an orifice, a plunger in said receptacle, means for automatically extending the plunger, means for retracting the plunger, and a spring-operated closure for said orifice.

2. A sanitary drinking utensil, comprising a receptacle, a cover therefor having an aperture, a spring operated closure for said aperture, a plunger in said receptacle, resilient means for extending said plunger, and means for retracting the plunger.

3. A sanitary drinking utensil, comprising a receptacle, a cover therefor having an aperture, a deflector arranged above the aperture, a plunger arranged in said receptacle, resilient means for moving the plunger in one direction, manually operable means for moving the plunger in the other direction, and a chin rest attached to said receptacle.

4. A drinking utensil, comprising a cup, a sleeve telescopically engaging said cup, a cover for the sleeve having an aperture, a plunger arranged within said sleeve and means for operating said plunger.

5. A drinking utensil comprising a cup, a sleeve separably connected with said cup, a cover for the sleeve having an orifice, a spring held closure for the orifice, a plunger arranged within said sleeve, resilient means for moving said plunger in one direction and manually operable means for moving the plunger in the opposite direction.

In testimony whereof I affix my signature in the presence of two witnesses.

AUGUST H. HARTMAN.

Witnesses:
J. A. TAYLOR,
L. F. LANE.

Copies of this patent may be obtained for five cents each, by addressing the "Commissioner of Patents, Washington, D. C."